United States Patent
Asano

(10) Patent No.: US 7,756,656 B2
(45) Date of Patent: Jul. 13, 2010

(54) MEASUREMENT COORDINATE SETTING SYSTEM AND METHOD

(75) Inventor: Masafumi Asano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 727 days.

(21) Appl. No.: 11/783,472

(22) Filed: Apr. 10, 2007

(65) Prior Publication Data

US 2007/0254386 A1 Nov. 1, 2007

(30) Foreign Application Priority Data

Apr. 12, 2006 (JP) ............................ 2006-110022

(51) Int. Cl.
*G01N 37/00* (2006.01)
(52) U.S. Cl. ........................................................ 702/83
(58) Field of Classification Search ................... 702/83, 702/116, 117, 118, 182–185, 188
See application file for complete search history.

(56) References Cited

U.S. PATENT DOCUMENTS

| | | | |
|---|---|---|---|
| 6,259,960 B1 * | 7/2001 | Inokuchi | 700/110 |
| 6,866,976 B2 | 3/2005 | Asano et al. | |
| 7,088,426 B2 | 8/2006 | Hirukawa et al. | |
| 2005/0202328 A1 | 9/2005 | Smith et al. | |

OTHER PUBLICATIONS

B. Moon et al., "Wafer Sampling by Regression for Systematic Wafer Variation Detection," Proceedings of SPIE, vol. 5755, pp. 212-221 (2005).

* cited by examiner

*Primary Examiner*—Edward Raymond
(74) *Attorney, Agent, or Firm*—Finnegan, Henderson, Farabow, Garrett & Dunner, L.L.P.

(57) ABSTRACT

A measurement coordinate setting system is disclosed, which includes a measuring apparatus which measures a dimension in each of a plurality of portions of a first product, a sampling approximation module which approximates a distribution of the dimensions of the plurality of portions using a sampling orthogonal polynomial as a function of a coordinate, and a selection coordinate setting module which sets a plurality of selection coordinates at which dimensions of a second product are to be measured to inspect the approximated distribution of the dimensions regarding the second product.

20 Claims, 14 Drawing Sheets

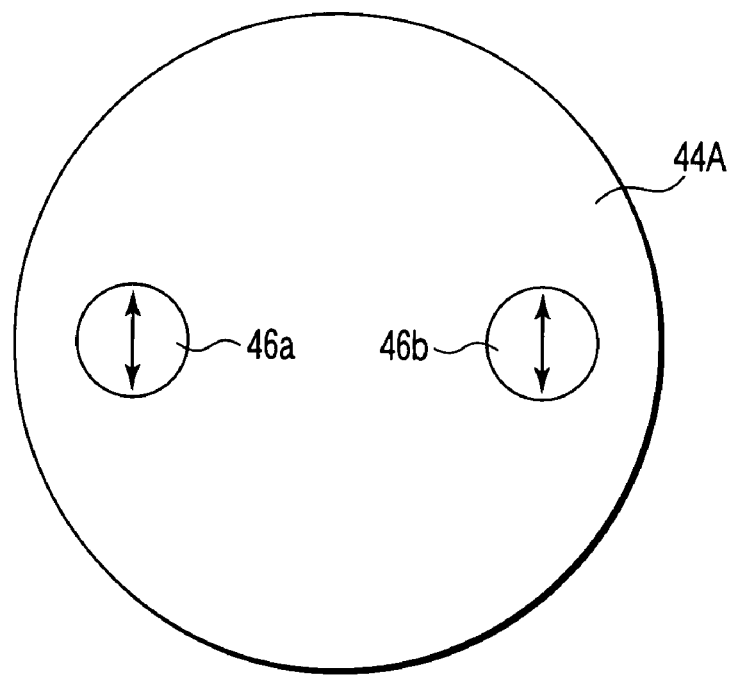
F I G. 3
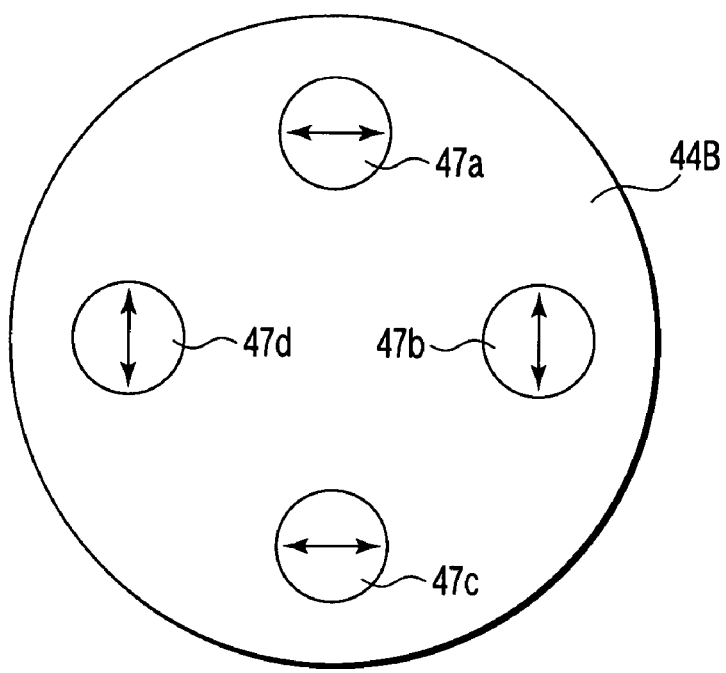
F I G. 4

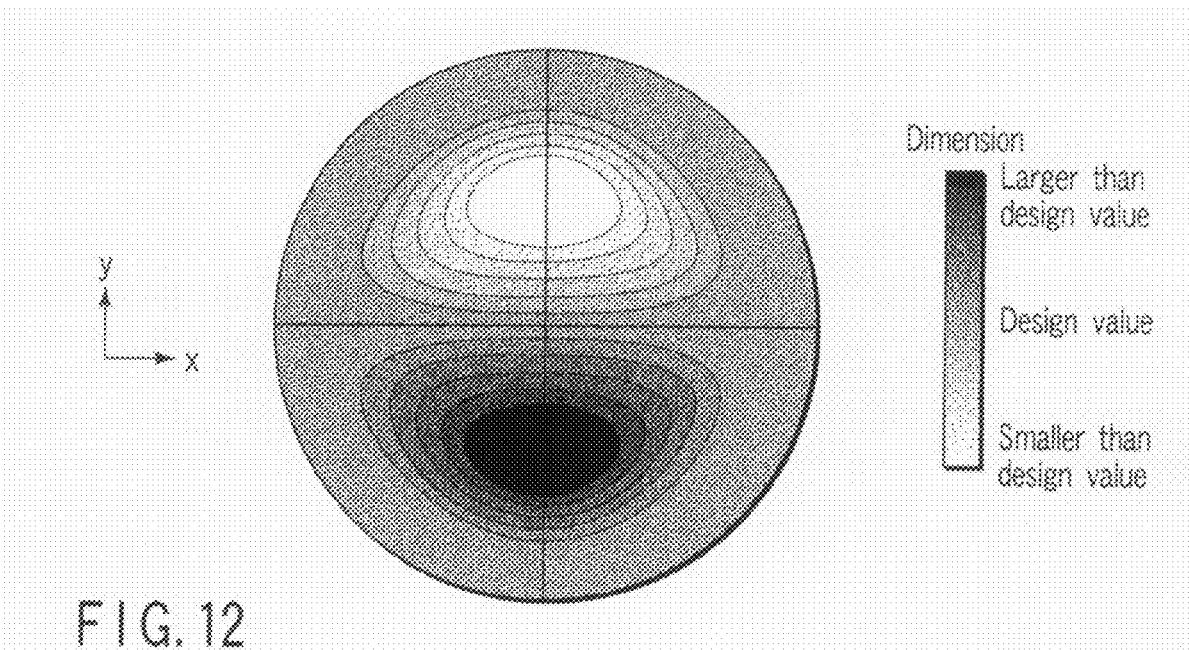
F I G. 12
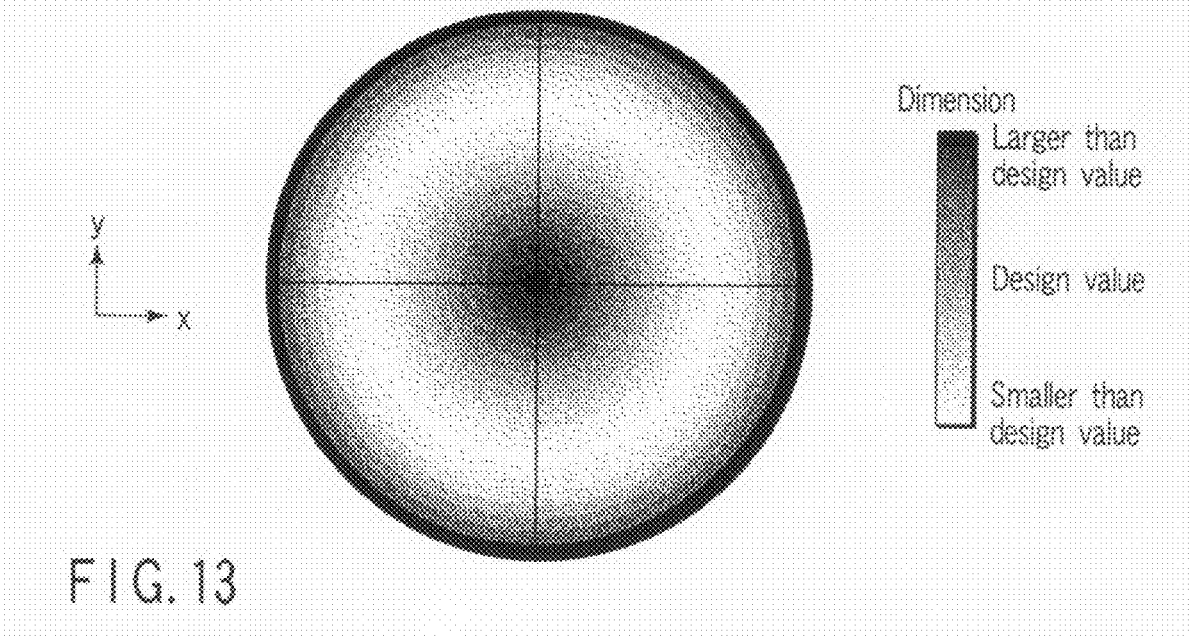
F I G. 13

| Terms of Zernike polynomial | Distribution component | Selection coordinates | | | |
|---|---|---|---|---|---|
| Z2 | Gradient in x-direction | $(s, 0)$ | $(s, 0)$ | | |
| Z3 | Gradient in y-direction | $(0, s)$ | $(0, -s)$ | | |
| Z4 | Secondary gradient in concentric direction | $\left(-\frac{1}{\sqrt{2}}s, -\frac{1}{\sqrt{2}}s\right)$ | $(0, 0)$ | $\left(-\frac{1}{\sqrt{6}}s, -\frac{1}{\sqrt{6}}s\right)$ | |
| Z5 | Difference between 0° and 90° directions | $(s, 0)$ | $(0, s)$ | | |
| Z6 | Difference between 45° and 135° directions | $\left(\frac{1}{\sqrt{2}}s, \frac{1}{\sqrt{2}}s\right)$ | $\left(\frac{1}{\sqrt{2}}s, -\frac{1}{\sqrt{2}}s\right)$ | | |
| Z7 | High-order gradient in x-direction | $(s, 0)$ | $\left(\frac{\sqrt{2}}{3}s, 0\right)$ | $\left(-\frac{\sqrt{2}}{3}s, 0\right)$ | $(-s, 0)$ |
| Z8 | High-order gradient in y-direction | $(0, s)$ | $\left(0, \frac{\sqrt{2}}{3}s\right)$ | $\left(0, -\frac{\sqrt{2}}{3}s\right)$ | $(0, -s)$ |
| Z9 | Fourth-order gradient in concentric direction | $\left(-\frac{1}{\sqrt{2}}s, 0\right)$ | $(0, 0)$ | $\left(-\frac{1}{2\sqrt{3}}s, -\frac{1}{2\sqrt{3}}s\right)$ | $\left(-\frac{1}{\sqrt{6}}s, \frac{1}{\sqrt{6}}s\right)$ |

FIG. 15

MEASUREMENT COORDINATE SETTING SYSTEM AND METHOD

CROSS-REFERENCE TO RELATED APPLICATIONS

This application is based upon and claims the benefit of priority from prior Japanese Patent Application No. 2006-110022, filed Apr. 12, 2006, the entire contents of which are incorporated herein by reference.

BACKGROUND OF THE INVENTION

1. Field of the Invention

The present invention relates to a technique of manufacturing semiconductor devices. In particular, the present invention relates to measurement coordinate setting system and method.

2. Description of the Related Art

In a process of manufacturing semiconductor devices, dimensions of patterns formed on a surface of a wafer or wafers must be uniform in the surface plane of the wafer or between the wafers. For this reason, wafers are sampled during the manufacture process to inspect whether or not the dimensions of the formed patterns are uniform. A distribution of the dimensions of the patterns formed on the wafer surface often depends on the characteristic of the manufacturing device such as a lithography device, an etching device, etc. Therefore, the distribution of the pattern dimension in the surface plane often shows a specific scheme reflecting the device characteristic. Thus, in the inspection, it is important to determine a dimensional distribution scheme to improve the manufacturing process. On the other hand, it is preferable that the number of necessary samplings for inspection is as less as possible to reduce the inspection cost. Thus, it is desirable to provide a method of extracting the least number of samples with which the dimensional distribution mode may be determined. However, many of the conventional sampling methods employ complicated algorithms (e.g., see B. Moon, J. McNames, B. Whitefield, P. Rudolph, J. Zola, "Wafer Sampling by Regression for Systematic wafer Variation Detection", (US), Proceedings of SPIE 5755, 2005, P 212-221). Due to such complicated algorithms being used, it is difficult to introduce the conventional sampling methods into the process of manufacturing semiconductor devices.

The present invention provides measurement coordinate setting system and method, which can reduce the number of samples for inspecting dimensional variations of products.

BRIEF SUMMARY OF THE INVENTION

According to an aspect of the present invention, there is provided a measurement coordinate setting system comprising:

a measuring apparatus which measures a dimension in each of a plurality of portions of a first product;

a sampling approximation module which approximates a distribution of the dimensions of the plurality of portions using a sampling orthogonal polynomial as a function of a coordinate; and a selection coordinate setting module which sets a plurality of selection coordinates at which dimensions of a second product are to be measured to inspect the approximated distribution of the dimensions regarding the second product.

According to another aspect of the present invention, there is provided a measurement coordinate setting system comprising:

a measuring apparatus which measures a dimension of each of a plurality of portions of a first product;

a sampling approximation module which approximates a distribution of the dimensions of the plurality of portions using a sampling orthogonal polynomial as a function of a coordinate, and calculates a development coefficient in each of the terms of the sampling orthogonal polynomial;

a sampling error calculation module 122 which calculates an approximate error e of the sampling orthogonal polynomial;

a sampling determination module 123 which determines whether or not the development coefficients of the terms of the sampling orthogonal polynomial have significance, using the approximate error e of the sampling orthogonal polynomial; and a selection coordinate setting module 124 which sets as selection coordinates a plurality of coordinates corresponding to the terms of the sampling orthogonal polynomial which terms include the development coefficients determined as having significance by the sampling determination module 123 to inspect the approximated distribution of the dimensions regarding a second product.

According to a further aspect of the present invention, there is provided a measurement coordinate setting method comprising:

measuring a dimension in each of a plurality of portions of a first product;

approximating a distribution of the dimensions of the plurality of portions using a sampling orthogonal polynomial as a function of a coordinate; and setting a plurality of selection coordinates at which dimensions of a second product are to be measured to inspect the approximated distribution of the dimensions regarding the second product.

BRIEF DESCRIPTION OF THE SEVERAL VIEWS OF THE DRAWING

FIG. 3 is a top plan view showing a first example of a polarizer according to the first embodiment of the present invention;

FIG. 4 is a top plan view showing a second example of the polarizer according to the first embodiment of the present invention;

FIG. 12 is a schematic view showing a seventh distribution component forming the dimensional plane distribution of the first product according to the first embodiment of the present invention;

FIG. 13 is a schematic view showing an eighth distribution component forming the dimensional plane distribution of the first product according to the first embodiment of the present invention;

FIG. 15 is a table showing the relationship between distribution components expressed by items of Zernike polynomial and selection coordinates;

DETAILED DESCRIPTION OF THE INVENTION

Figure 1:
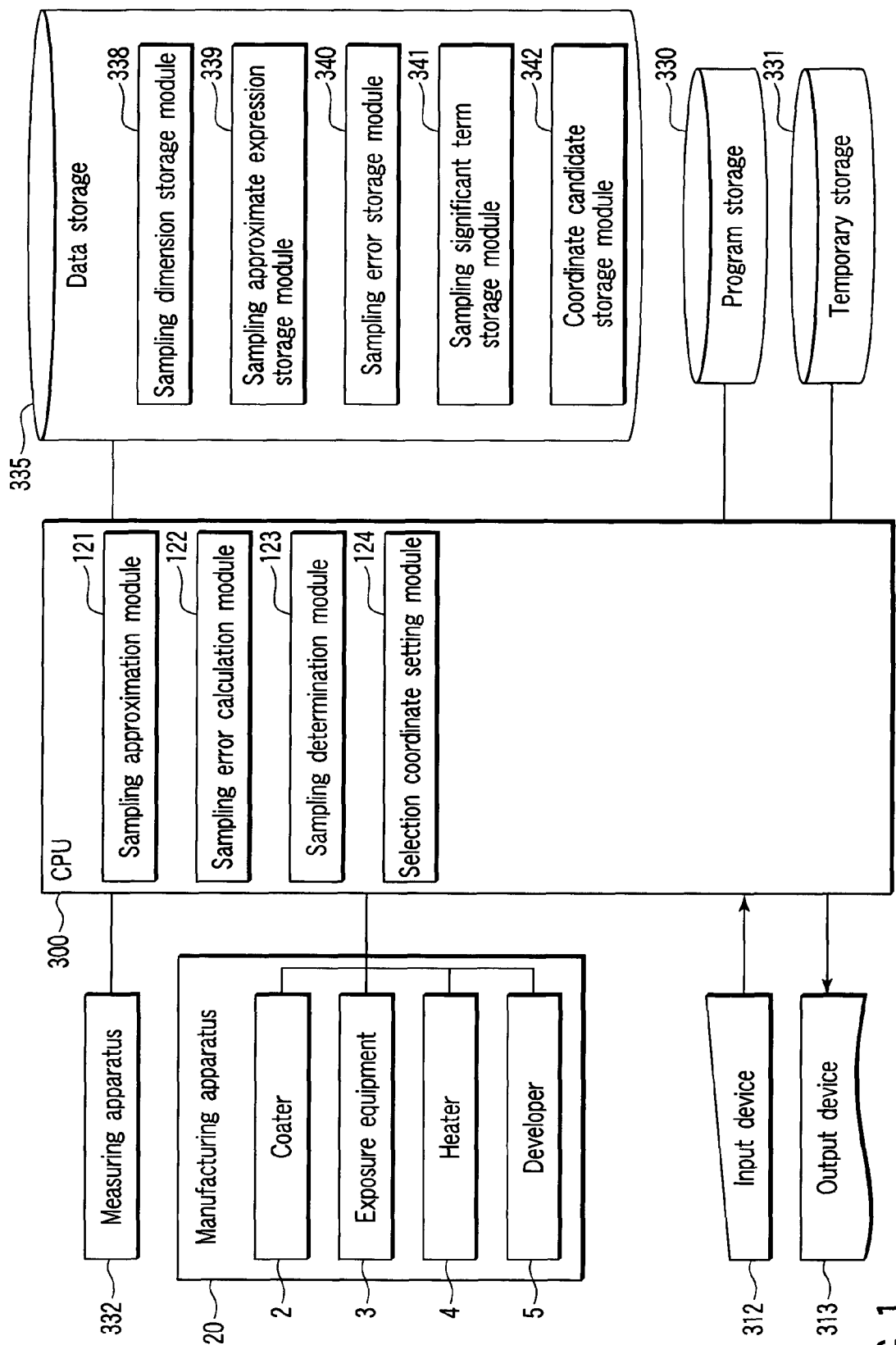
FIG. 1 is a block diagram showing the configuration of a measurement coordinate setting system according to a first embodiment of the present invention.

Embodiments of the present invention will be hereinafter described with reference to the accompanying drawings. In following drawings, the same reference numerals are used to designate the identical or similar portions.

First Embodiment

A measurement coordinate setting system of the first embodiment comprises a measuring apparatus 332 and a central processing unit (CPU) 300, as shown in FIG. 1. The measuring apparatus measures dimensions of a plurality of portions of a first product in a surface plane of the first product. The CPU 300 includes a sampling approximation module 121 and a selection coordinate setting module 124. The module 121 approximates a distribution of the measured dimensions in the surface plane as a function of a plane coordinate, using a sampling orthogonal polynomial such as Zernike polynomial. The module 124 sets selection coordinates in which dimensions of a plurality of portions of a second product in a surface plane of the second product are measured to inspect whether or not the second product has the approximated distribution of the dimensions. Here, the dimensions of the plurality of portions of the first product and the dimensions of the plurality of portions of the second product mean the depth of a plurality of trenches formed in a wafer such as a semiconductor substrate, the thickness of a plurality of portions of a resist film, insulating film and conductive film formed on the wafer, the line width of a plurality of portions of a resist pattern formed on the wafer, etc. In the first embodiment, the line width of a plurality of portions of a resist pattern formed on a wafer is given as the dimensions of a plurality of portions of the first or second product.

The CPU 300 is connected to a manufacturing apparatus 20, which manufactures first and second products on a plane. The manufacturing apparatus 20 comprises a coater 2, an exposure equipment 3, a heater 4 and a developer 5. The coater 2 coats a resist film on a wafer. The exposure equipment 3 exposes the coated resist film. The heater 4 heats the resist film. The developer 5 develops the resist film to form a resist pattern on a wafer.

A spin coater may be used as the coater 2. The coater 2 coats a photoresist on a first wafer such as a semiconductor substrate using spin coating to form a first resist film on the first wafer. Moreover, the coater 2 coats a photoresist on a second wafer such as a semiconductor substrate using spin coating to form a second resist film on the second wafer.

Figure 2:
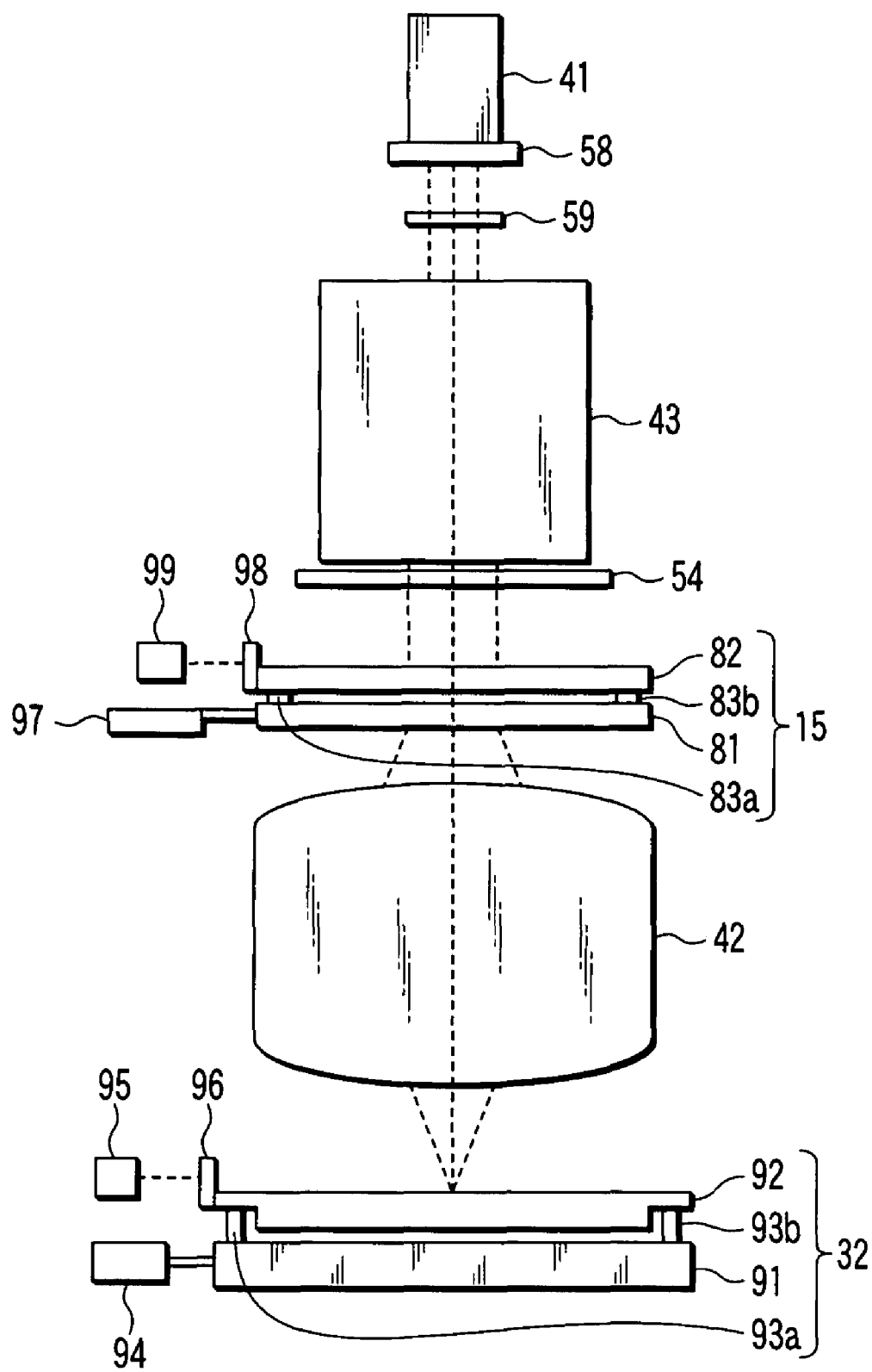
FIG. 2 is a schematic view showing an exposure equipment according to the first embodiment of the present invention.

As shown in FIG. 2, the exposure equipment 3 includes an illumination beam source 41, a diaphragm holder 58, a polarizer 59, an optical beam collecting system 43, a slit holder 54, a reticle stage 15, an optical beam projecting system 42, and a wafer stage 32. The illumination beam source 41 emits an irradiation beam such as ArF laser. The diaphragm holder 58 is arranged on the emission side of the illumination beam source 41. The polarizer 59 polarizes the irradiation beam emitted from the illumination beam source 41 via the diaphragm holder 58. The optical beam collecting system 43 collects the polarized irradiation beam. The slit holder 54 is arranged on the emission side of the optical beam collecting system 43. The reticle stage 15 is arranged below the slit holder 54. The optical beam projecting system 42 is arranged below the reticle stage 15. The wafer stage 32 is arranged below the optical beam projecting system 42.

For example, as illustrated in FIG. 3, the polarizer 59 comprises a light shield plate 44A and two circular polarization windows 46a, 46b formed in the light shield plate 44A. Irradiation beams transmitted through polarization windows 46a and 46b are aligned in parallel via the optical axis along the polarization direction indicated by arrows. In this way, double-pole illumination is set. Alternatively, as depicted in FIG. 4, the polarizer 59 comprises a light shield plate 44B and four circular polarization windows 47a to 47d formed in the light shield plate 44B. Irradiation beams transmitted through polarization windows 47a and 47c are aligned in parallel via the optical axis along the polarization direction indicated by arrows. On the other hand, irradiation beams transmitted through polarization windows 47b and 47d are aligned in parallel via the optical axis along the polarization direction indicated by arrows. The polarization direction of the irradiation beams transmitted through polarization windows 47a and 47c is orthogonal to the irradiation beams transmitted through polarization windows 47b and 47d. In this way, quadrupole illumination is set. As described above, according to the configuration of the polarizer 59, multipole illumination such as double-pole and quadrupole illumination is set.

A photomask is placed on the reticle stage 15 shown in FIG. 2. The reticle stage 15 includes a reticle XY stage 81, reticle movable axis 83a, 83b and a reticle Z-gradient stage 82. The reticle movable axis 83a and 83b are arranged above the reticle stage 81. The reticle Z-gradient stage 82 is connected to the reticle XY state 81 via reticle movable axis 83a and 83b. The reticle stage 15 is connected to a reticle stage actuator 97. The reticle stage actuator 97 horizontally moves the reticle XY stage 81. With the reticle XY stage 81 being horizontally moved, the reticle Z-gradient stage 82 is positioned to a desired position in the horizontal direction. Moreover, the reticle stage actuator 97 vertically moves each of reticle movable axes 83a and 83b. With the reticle movable axes 83a and 83b being vertically moved, the reticle Z-gradient stage 82 is inclined to the horizontal plane. A reticle movable mirror 98 is provided with on one end of the reticle Z-gradient stage 82. A reticle laser interferometer 99 is arranged facing the reticle movable mirror 98. The reticle laser interferometer 99 measures the position of the reticle Z-gradient stage 82.

The numerical aperture (NA) of the projection optical system 42 is 1.3, for example, and the projection magnification is ¼. A first or second wafer is placed on a wafer stage 32. The first wafer is coated with a first resist film onto which a mask pattern formed in a photomask is projected. The second wafer is coated with a second resist film onto which the mask pattern formed in the photomask is projected. The wafer stage 32 includes a wafer XY stage 91, a wafer movable axes 93a, 93b and a wafer Z-gradient stage 92. The wafer movable axes 93a and 93b are arranged above the wafer XY stage 91. The wafer Z-gradient stage 92 is connected to the wafer XY stage 91 via wafer movable axes 93a and 93b. The wafer stage 32 is connected to a wafer stage actuator 94. The wafer stage actuator 94 horizontally moves the wafer XY stage 91. With the wafer stage 91 being horizontally moved, the wafer Z-gradient stage 92 is positioned to a desired position in the horizontal direction. Moreover, the wafer stage actuator 94 vertically moves each of wafer movable axes 93a and 93b. With the wafer movable axes 93a and 93b being vertically moved, the wafer Z-gradient stage 92 is inclined to the horizontal plane. A wafer movable mirror 96 is provided on one end of the wafer Z-gradient stage 92. A wafer laser interferometer 95 is arranged facing the reticle movable mirror 96. The wafer laser interferometer 95 measures the position of the wafer Z-gradient stage 92.

The heater 4 shown in FIG. 1 heats, by carrying out a post-exposure bake (PEB), the first resist film on the first wafer exposed via the exposure equipment 3. Also, the heater 4 heats, by carrying out a post-exposure bake (PEB), the second resist film on the second wafer exposed via the exposure equipment 3. As the heater 3, a heater capable of managing heating conditions such as heating temperature and time may be used. The developer 5 develops the first resist film to form a first resist pattern as a first product on the first wafer. Similarly, the developer 5 develops the second resist film to form a second resist pattern as a first product on the second wafer. As the developer 5, a developer capable of managing development conditions such as developer concentration and time may be used.

Figure 5:
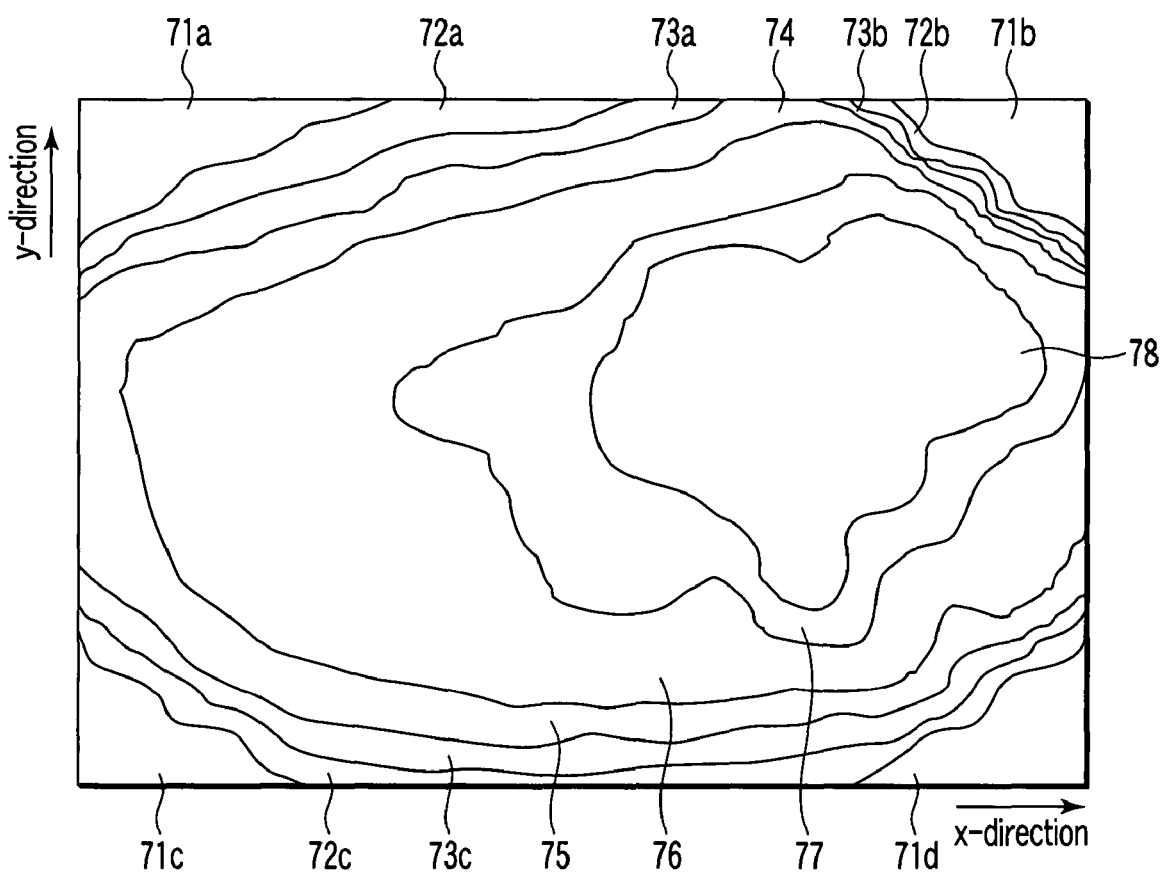
FIG. 5 is a schematic view showing dimensional variations of a first product on a first wafer according to the first embodiment of the present invention.

The measuring apparatus 332 defines an x-y coordinate system on the first wafer. The measuring apparatus 332 further measures the line width of the first resist pattern on each of a plurality of, for example, 80 measurement coordinates on the first wafer. The line width of the first resist pattern varies if device parameter of the coater 2, exposure equipment 3, heater 4 or developer is not optimized. For example, the design value of the line width of the first resist pattern is 65 nm. However, in first areas 71a to 71d on the wafer shown in FIG. 5, the line width of the manufactured first resist pattern is less than 62 nm. In second areas 72a to 72c, the line width of the manufactured first resist pattern is more than 62 nm and less than 63 nm. In third areas 73a to 73c, the line width of the manufactured first resist pattern is more than 63 nm and less than 64 nm. In the fourth area 74, the line width of the manufactured first resist pattern is more than 64 nm and less than 65 nm. In the fifth area 75, the line width of the manu-factured first resist pattern is more than 65 nm and less than 66 nm. In the sixth area 76, the line width of the manufactured first resist pattern is more than 66 nm and less than 67 nm. In the seventh area 77, the line width of the manufactured first resist pattern is more than 67 nm and less than 68 nm. In the eighth area 78, the line width of the manufactured first resist pattern is more than 68 nm. As the measuring apparatus 332 shown in FIG. 1, an atomic force microscope (AFM), a scanning electron microscope (SEM) and scatterometry may be used.

The sampling approximation module 121 approximates the plane distribution of the line width of the first resist pattern on the first wafer using a sampling orthogonal polynomial. The sampling orthogonal polynomial is expressed by the following equation (1)

$$W_{fit}(r, \phi) = a_1 Z_1(r, \phi) + a_2 Z_2(r, \phi) + a_3 Z_3(r, \phi) + a_4 Z_4(r, \phi) + \quad (1)$$
$$a_5 Z_5(r, \phi) + a_6 Z_6(r, \phi) + a_7 Z_7(r, \phi) + a_8 Z_8(r, \phi) +$$
$$a_9 Z_9(r, \phi)\ldots$$
$$= \sum_{n=1}^{m} a_n Z_n(r, \phi)$$

In the equation (1), "r" indicates the distance between the origin 0 of the x-y coordinate system defined on the first wafer and the measurement coordinate in which the line width of the first resist pattern is measured. "φ" indicates an angle between the straight line connecting the origin 0 and the measurement coordinate and the X axis. The measurement coordinate is expressed as a polar coordinate (r, φ). "Wfit (r, φ) is an approximate value of the line width of the first resist pattern in a measurement coordinate (r, φ) on the first wafer. Moreover, first to ninth terms of the sampling orthogonal polynomial are given from the following equations (2) to (10).

$$Z1(r, \phi)=1 \quad (2)$$

$$Z2(r, \phi)=r\cos\phi \quad (3)$$

$$Z3(r, \phi)=r\sin\phi \quad (4)$$

$$Z4(r, \phi)=2r^2-1 \quad (5)$$

$$Z5(r, \phi)=r^2\cos 2\phi \quad (6)$$

$$Z6(r, \phi)=r^2\sin 2\phi \quad (7)$$

$$Z7(r, \phi)=(3r^3-2r)\cos\phi \quad (8)$$

$$Z8(r, \phi)=(3r^3-2r)\sin\phi \quad (9)$$

$$Z9(r, \phi)=6r^4-6r^2+1 \quad (10)$$

Figure 6:
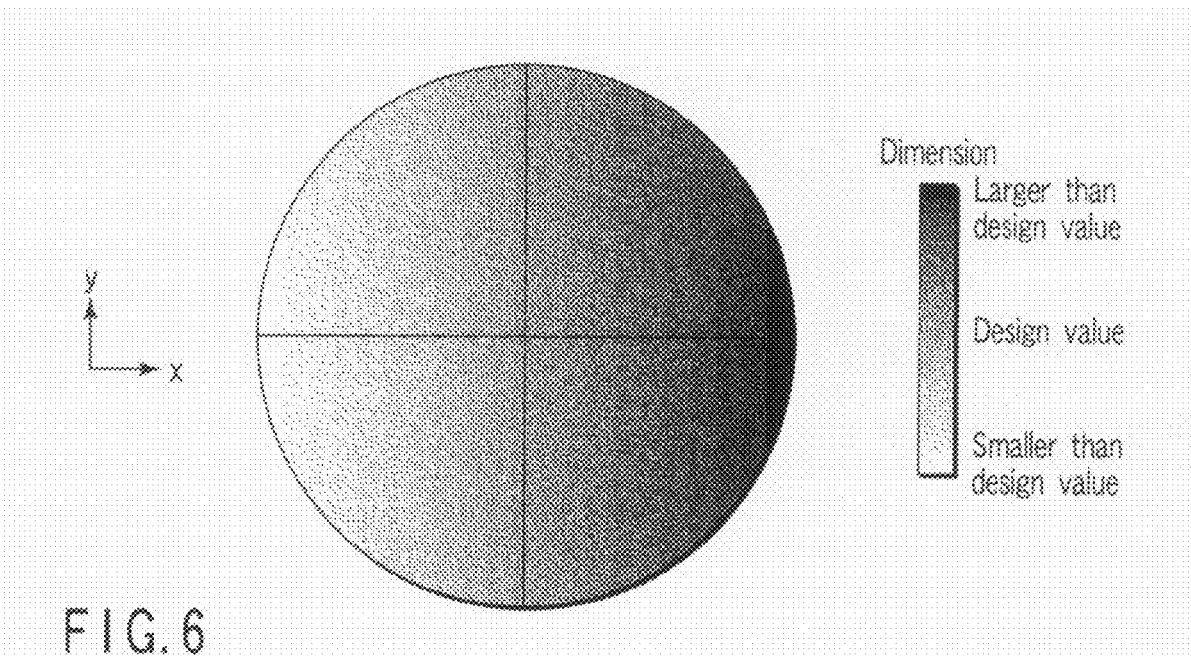
FIG. 6 is a schematic view showing a first distribution component forming the dimensional plane distribution of the first product according to the first embodiment of the present invention.
Figure 7:
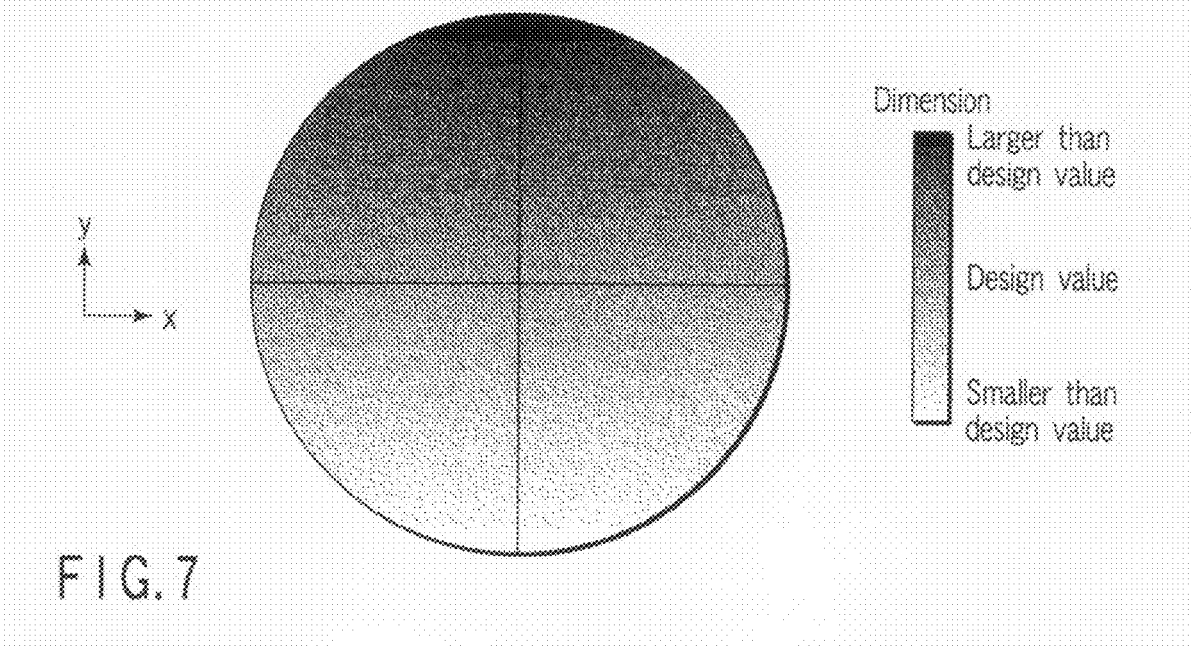
FIG. 7 is a schematic view showing a second distribution component forming the dimensional plane distribution of the first product according to the first embodiment of the present invention.
Figure 9:
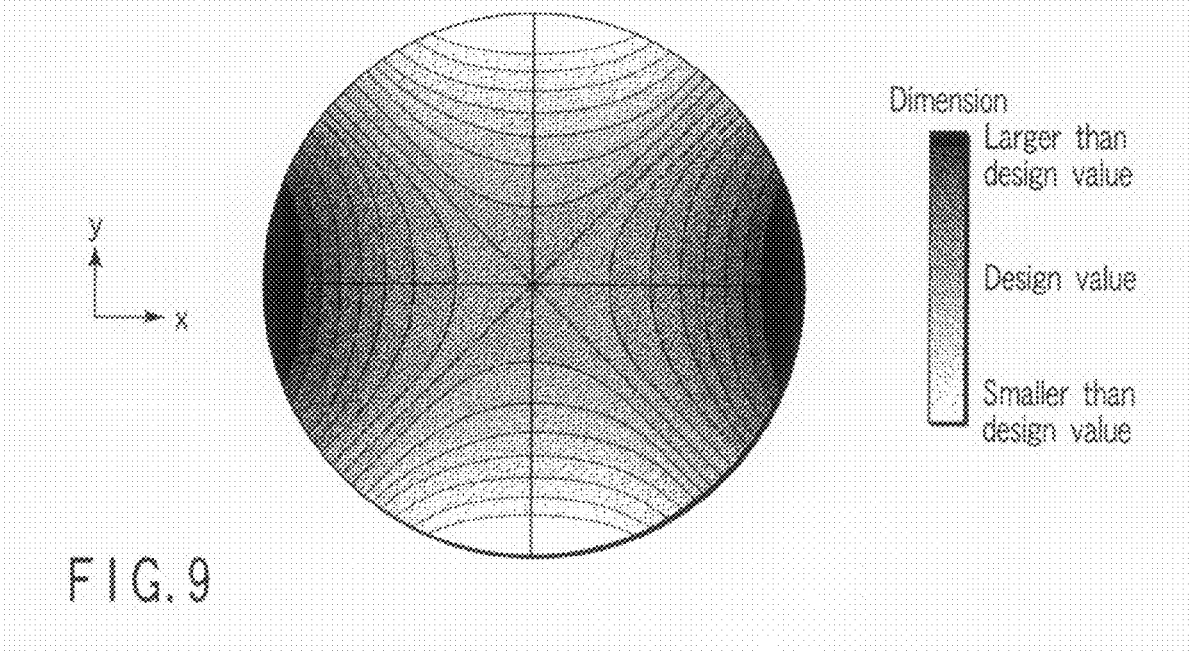
FIG. 9 is a schematic view showing a fourth distribution component forming the dimensional plane distribution of the first product according to the first embodiment of the present invention.
Figure 10:
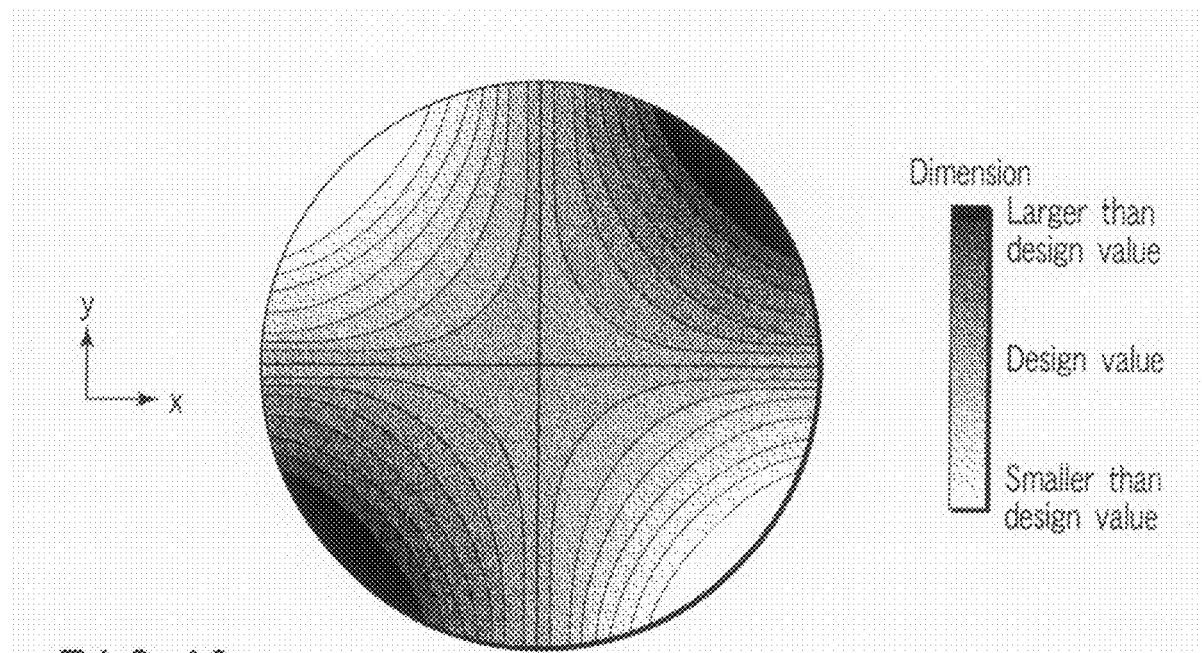
FIG. 10 is a schematic view showing a fifth distribution component forming the dimensional plane distribution of the first product according to the first embodiment of the present invention.

As seen from the equation (2), the first term of the sampling orthogonal polynomial is a constant term. The second term given by the equation (3) represents an x-direction distribution component shown in FIG. 6 included in the plane distribution. The third term given by the equation (4) represents a y-direction distribution component shown in FIG. 7 included in the plane distribution. The fourth term given by the equation (5) represents a concentric direction secondary distribution component shown in FIG. 8 included in the plane distribution. The fifth term given by the equation (6) represents a 0° and 90° direction distribution component shown in FIG. 9 included in the plane distribution. The sixth term given by the equation (7) represents a ±45° direction distribution component of shown in FIG. 10 included in the plane distribution.

Figure 11:
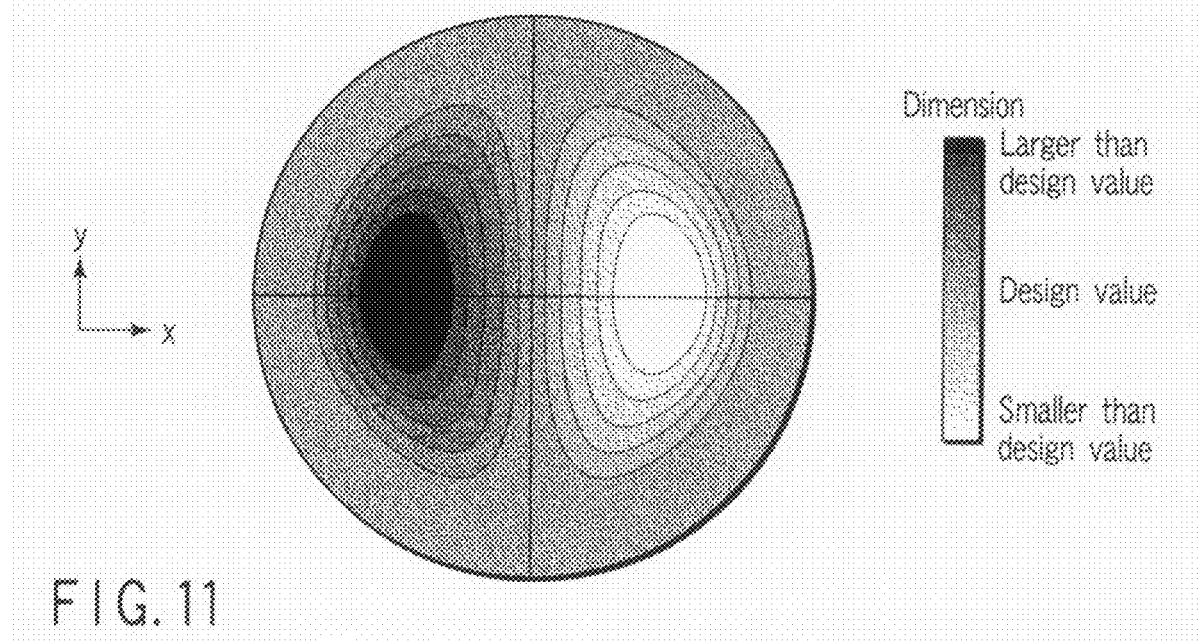
FIG. 11 is a schematic view showing a sixth distribution component forming the dimensional plane distribution of the first product according to the first embodiment of the present invention.

The seventh term given by the equation (8) represents an x-direction high-order distribution component shown in FIG. 11 included in the plane distribution. The eighth term given by the equation (9) represents a y-direction high-order distribution component shown in FIG. 12 included in the plane distribution. The ninth term given by the equation (10) represents a concentric direction fourth-order distribution component shown in FIG. 13 included in the plane distribution.

Regarding the measurement coordinates in which the line width of the first resist pattern is measured, the sampling approximation module 121 makes a substitution of the actual measured value Wact $(r, \phi)$ of the line width of the first resist pattern for the approximate term wfit $(r, \phi)$ of the line width of the first resist pattern in the equation (1) to provide a plurality of equations. The module 121 solves the simultaneous equations, and thereby, calculates development coefficients a1 to a9 of the first to ninth terms of the sampling orthogonal polynomial. The second development coefficient of the second term, that is, a2 represents the strength in the x-direction distribution component shown in FIG. 6. If the second development coefficient a2 is large, the line width of the first resist pattern continuously and largely changes in the x-direction. Conversely, if the second development coefficient a2 is small, the line width of the first resist pattern continuously and small changes in the x-direction. The third development coefficient of the third term, that is, a3 represents the strength in the y-direction distribution component shown in FIG. 7. If the third development coefficient a3 is large, the line width of the first resist pattern continuously and largely changes in the y-direction. Conversely, if the third development coefficient a3 is small, the line width of the first resist pattern continuously and small changes in the y-direction.

Figure 8:
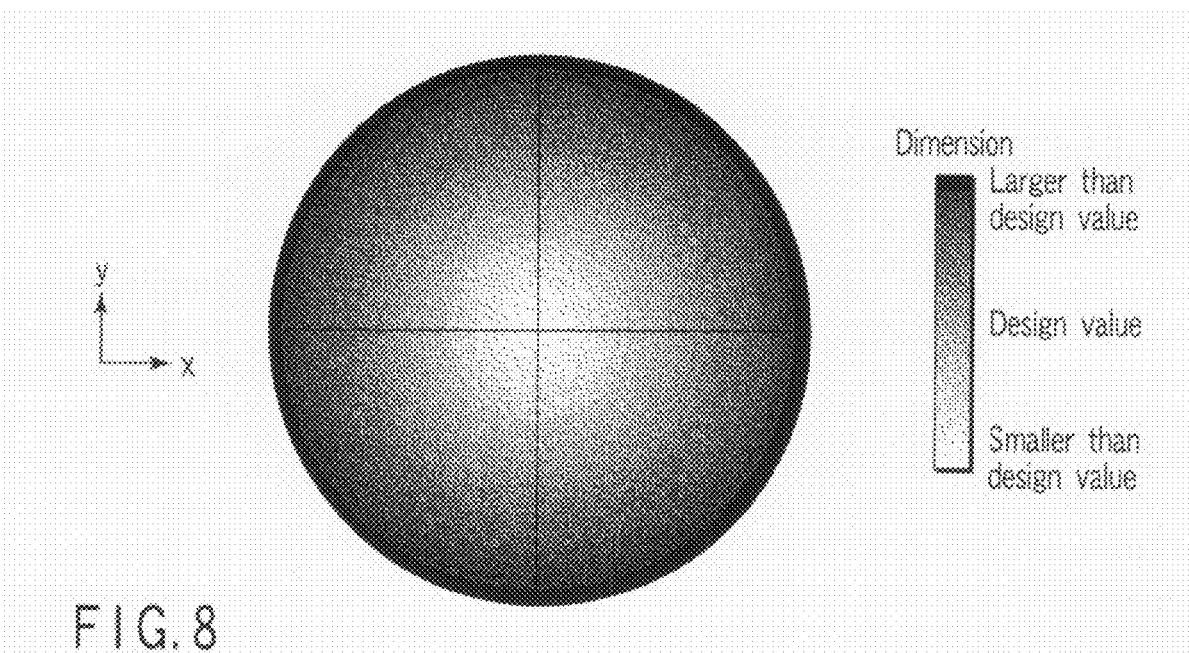
FIG. 8 is a schematic view showing a third distribution component forming the dimensional plane distribution of the first product according to the first embodiment of the present invention.

The fourth development coefficient of the fourth term, that is, a4 represents the strength of the concentric direction secondary distribution component shown in FIG. 8. If the fourth development coefficient a4 is large, the line width of the first resist pattern continuously and largely changes in the concentric direction. Conversely, if the fourth development coefficient a4 is small, the line width of the first resist pattern continuously and small changes in the concentric direction. The fifth development coefficient of the fifth term, that is, a5 represents the strength of the 0° and 90° direction distribution component shown in FIG. 9. If the fifth development coefficient a5 is large, the line width of the first resist pattern continuously and largely changes in the 0° and 90° direction. Conversely, if the fifth development coefficient a5 is small, the line width of the first resist pattern continuously and small changes in the 0° to 90° direction. The sixth development coefficient of the sixth term, that is, a6 represents the strength of the ±45° direction distribution component shown in FIG. 10. If the sixth development coefficient a5 is large, the line width of the first resist pattern continuously and largely changes in the +45° direction and in the −45° direction. Conversely, if the sixth development coefficient a5 is small, the line width of the first resist pattern continuously and small changes in the +45° direction and in the −45° direction.

The seventh development coefficient of the seventh term, that is, a7 represents the strength of the x-direction high-order distribution component shown in FIG. 11. If the seventh development coefficient a7 is large, the line width of the first resist pattern largely changes while repeatedly increasing and decreasing in the x-direction. Conversely, if the seventh development coefficient a7 is small, the line width of the first resist pattern changes small while repeatedly increasing and decreasing in the x-direction. The eighth development coefficient of the eighth term, that is, a8 represents the strength of the y-direction high-order distribution component shown in FIG. 12. If the eighth development coefficient a8 is large, the line width of the first resist pattern largely changes while repeatedly increasing and decreasing in the y-direction. Conversely, if the eighth development coefficient a8 is small, the line width of the first resist pattern changes small while repeatedly increasing and decreasing in the y-direction. The ninth development coefficient of the ninth term, that is, a9 represents the strength of the concentric direction fourth-order distribution component shown in FIG. 13. If the ninth development coefficient a9 is large, the line width of the first resist pattern largely changes while repeatedly increasing and decreasing in the concentric direction. Conversely, if the ninth development coefficient a9 is small, the line width of the first resist pattern changes small while repeatedly increasing and decreasing in the concentric direction. Even if the line width of the first resist pattern on the first wafer has a random plane distribution, the plane distribution is approximated using the sampling orthogonal polynomial. In this way, the random plane distribution is resoluble into a plurality of distribution components each showing a constant mode.

The CPU 300 further has sampling error calculation module 122 and sampling determination module 123. The sampling error calculation module 122 calculates an approximate error e of the sampling orthogonal polynomial using the following equation (11)

$$e = \sqrt{\frac{\sum_{i=1}^{m}(W_{fit}(r_i, \phi_i) - W_{act}(r_i, \phi_i))^2}{m}} \quad (11)$$

In the equation (11) "i" is a natural number. "$(r_i, \phi_i)$" expresses i coordinate measuring the actual value of the line width of the first resist pattern. "m" is a natural number, and expresses the total number of measurement coordinates in which the actual value of the line width of the first resist pattern is measured.

The sampling determination module 123 determines a significance of each of the first to ninth development coefficients a1 to a9 included in the sampling orthogonal polynomial by equal dispersion test (F test) using the approximate error e. If the development coefficient is significant, the distribution component expressed by the term having the significant development coefficient is included in the actual plane distribution of the line width of the first resist pattern. For example, let it be assumed that the first, second, fourth, fifth, sixth and seventh development coefficients a1, a2, a4, a5, a6 and a7 are significant, and that the value of the first development coefficient a1 is 67.7, the value of the second development coefficient a2 is 0.02662, the value of the fourth development coefficient a4 is −0.0001, the value of the fifth development coefficient a5 is 0.00013, the value of the sixth development coefficient a6 is $7.2 \times 10^{-5}$, and the value of the seventh development coefficient a7 is $-3 \times 10^{-7}$. In this case, the approximate value Wfit $(r, \phi)$ of the line width of the first resist pattern is obtained from the following equation (12)

$$W_{fit}(r, \varphi) = 67.7 + 0.02662 \times Z_2(r, \phi) - 0.0001 \times Z_4(r, \phi) + \\ 0.00013 \times Z_5(r, \phi) + 7.2 \times 10^{-5} \times Z_6(r, \varphi) - 3 \times 10^{-7} \times Z_7(r, \varphi) \quad (12)$$

Figure 14:
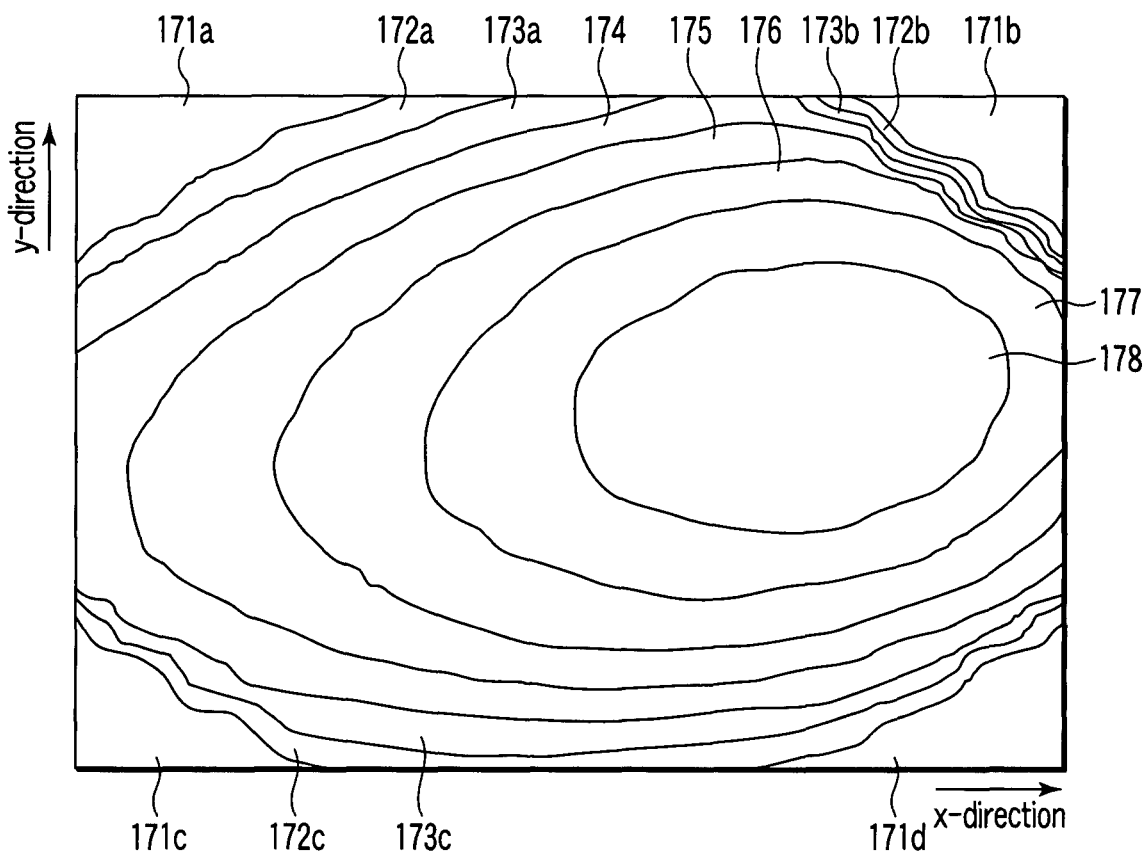
FIG. 14 is a schematic view showing approximated dimensional variations of the first product on the first wafer according to the first embodiment of the present invention.

FIG. 14 shows a plane distribution approximated using the equation (12). In FIG. 14, first areas 171a to 171d shows areas in which the approximated line width of the first resist pattern is less than 62 nm. Second areas 172a to 172c shows areas in which the approximated line width of the first resist pattern is more than 62 nm and less than 63 nm. Third areas 173a to 173c shows areas in which the approximated line width of the first resist pattern is more than 63 nm and less than 64 nm. Fourth area 174 shows areas in which the approximated line width of the first resist pattern is more than 64 nm and less than 65 nm. Fifth area 175 shows areas in which the approximated line width of the first resist pattern is more than 65 nm and less than 66 nm. Sixth area 176 shows areas in which the approximated line width of the first resist pattern is more than 66 nm and less than 67 nm. Seventh area 177 shows areas in which the approximated line width of the first resist pattern is more than 67 nm and less than 68 nm. Eighth area 178 shows areas in which the approximated line width of the first resist pattern is more than 68 nm. As is evident from FIG. 14, it can be seen that the equation (12) sufficiently approximates to the actual plane distribution shown in FIG. 5.

The selection coordinate setting module 124 shown in FIG. 1 sets a plurality of selection coordinates in which the distribution components are inspected with respect to a second resist pattern. The plurality of distribution components include distribution components expressed by a plurality of terms of the sampling orthogonal polynomial, which terms include the development coefficient determined as having significance. For example, when the second term expressing the x-direction distribution component is significant, the selection coordinate setting module 124 sets coordinates (s, 0) and (−s, 0) expressed by an orthogonal coordinate on the second wafer as the selection coordinates in which the line width of the second resist pattern is measured using the measuring apparatus 332. Incidentally, "s" expresses a real number. The selection coordinates (s, 0) and (−s, 0) has a symmetrical positional relationship with respect to the origin (0, 0) in the x-direction. Thus, the line width of the second resist pattern is measured at these selection coordinates (s, 0) and (−s, 0). In this way, it is possible to inspect whether or not the line width of the second resist pattern changes in the x-direction.

When the third term expressing the y-direction distribution component is significant, the module 124 sets coordinates (0, s) and (0, −s) expressed by the orthogonal coordinate on the second wafer as the selection coordinates in which the line width of the second resist pattern is used using the measuring apparatus 332. The selection coordinates (0, s) and (0, −s) has a symmetrical positional relationship with respect to the origin (0, 0) in the y-direction. Thus, the line width of the second resist pattern is measured at these selection coordinates (0, s) and (0, −s). In this way, it is possible to inspect whether or not the line width of the second resist pattern changes in the y-direction.

When the fourth term expressing the concentric direction secondary distribution component is significant, the module 124 sets at least three coordinates $(-(\tfrac{1}{2})^{1/2}s, -(\tfrac{1}{2})^{1/2}s)$, (0, 0) and $(-(\tfrac{1}{6})^{1/2}s, -(\tfrac{1}{6})^{1/2}s)$ on the wafer as the selection coordinates in which the line width of the second resist pattern is measured using the measuring apparatus 332. The selection coordinates $(-(\tfrac{1}{2})^{1/2}s, -(\tfrac{1}{2})^{1/2}s)$ and $(-(\tfrac{1}{6})^{1/2}s, -(\tfrac{1}{6})^{1/2}s)$ have a positional relationship in which the distance from the origin (0, 0) is different to each other. Thus, the line width of the second resist pattern is measured at these selection coordinates $(-(\tfrac{1}{2})^{1/2}s, -(\tfrac{1}{2})^{1/2}s)$ and $(-(\tfrac{1}{6})^{1/2}s, -(\tfrac{1}{6})^{1/2}s)$. In this way, it is possible to inspect whether or not the line width of the second resist pattern changes in the concentric direction.

When the fifth term expressing the 0° and 90° direction distribution component is significant, the module 124 sets coordinates (s, 0) and (0, s) expressed by the orthogonal coordinate on the second wafer as the selection coordinates in which the line width of the second resist pattern is measured using the measuring apparatus 332. These selection coordinates (s, 0) and (0, s) have symmetrical positional relationship with respect to y=x. Thus, the line width of the second resist pattern is measured at these selection coordinates (s, 0) and (0, s). In this way, it is possible to inspect whether or not the line width of the second resist pattern changes in the 0° and 90° direction.

When the sixth term expressing the ±45° direction distribution component is significant, the module 124 sets coordinates $((\tfrac{1}{2})^{1/2}s, (\tfrac{1}{2})^{1/2}s)$, and $((\tfrac{1}{2})^{1/2}s, -(\tfrac{1}{2})^{1/2}s)$ on the wafer as the selection coordinates in which the line width of the second resist pattern is measured using the measuring apparatus 332. These selection coordinates $((\tfrac{1}{2})^{1/2}s, (\tfrac{1}{2})^{1/2}s)$ and $((\tfrac{1}{2})^{1/2}s, -(\tfrac{1}{2})^{1/2}s)$ have symmetrical positional relationship with respect to y=0. Thus, the line width of the second resist pattern is measured at these selection coordinates $((\tfrac{1}{2})^{1/2}s, (\tfrac{1}{2})^{1/2}s)$ and $((\tfrac{1}{2})^{1/2}s, -(\tfrac{1}{2})^{1/2}s)$. In this way, it is possible to inspect whether or not the line width of the second resist pattern changes in the ±45° direction.

When the seventh term expressing the x-direction high-order distribution component is significant, the module 124 sets coordinates (s, 0), $(2^{1/2}s/3, 0)$, $(-2^{1/2}s/3, 0)$ and (−s, 0) on the wafer as the selection coordinates in which the line width of the second resist pattern is measured using the measuring apparatus 332. The selection coordinates (s, 0) and (−s, 0) have a symmetrical positional relationship with respect to the origin (0, 0). Moreover, the selection coordinates $(2^{1/2}s/3, 0)$ and $(-2^{1/2}s/3, 0)$ have a symmetrical positional relationship with respect to the origin (0, 0). Thus, the line width of the second resist pattern is measured at these selection coordinates (s, 0), $(2^{1/2}s/3, 0)$, $(-2^{1/2}s/3, 0)$ and (−s, 0). In this way, it is possible to inspect whether or not the line width of the second resist pattern changes while repeatedly increasing and decreasing in the x-direction.

When the eighth term expressing the y-direction high-order distribution component is significant, the module 124 sets coordinates (0, s), $(0, 2^{1/2}s/3)$, $(0, -2^{1/2}s/3)$ and (0, −s) on the wafer as the selection coordinates in which the line width of the second resist pattern is measured using the measuring apparatus 332. The selection coordinates (0, s) and (0, −s) have a symmetrical positional relationship with respect to the origin (0, 0). Moreover, the selection coordinates $(0, 2^{1/2}s/3)$ and $(0, -2^{1/2}s/3)$ have a symmetrical positional relationship with respect to the origin (0, 0). Thus, the line width of the second resist pattern is measured at these selection coordinates (0, s), $(0, 2^{1/2}s/3)$, $(0, -2^{1/2}s/3)$ and (0, −s). In this way, it is possible to inspect whether or not the line width of the second resist pattern changes while repeatedly increasing and decreasing in the y-direction.

When the ninth term expressing the concentric fourth-order distribution component is significant, the module 124 sets coordinates $(-(\tfrac{1}{2})^{1/2}s, -(\tfrac{1}{2})^{1/2}s)$, $(-(\tfrac{1}{2})^{1/2}s, 0)$, (0, 0), $((\tfrac{1}{3})^{1/2}(s/2), -(\tfrac{1}{3})^{1/2}(s/2))$ and $(-(\tfrac{1}{6})^{1/2}s, -(\tfrac{1}{6})^{1/2}s)$ on the wafer as the selection coordinates in which the line width of the second resist pattern is measured using the measuring apparatus 332. The selection coordinates $(-(\tfrac{1}{2})^{1/2}s, -(\tfrac{1}{2})^{1/2}s)$, $(-(\tfrac{1}{2})^{1/2}s, 0)$, $((\tfrac{1}{3})^{1/2}(s/2), -(\tfrac{1}{3})^{1/2}(s/2))$ and $(-(\tfrac{1}{6})^{1/2}s, -(\tfrac{1}{6})^{1/2}s)$ have a positional relationship in which the distance from the origin (0, 0) is different from one another. Thus, the line width of the second resist pattern is measured at these selection coordinates $(-(\tfrac{1}{2})^{1/2}s, -(\tfrac{1}{2})^{1/2}s)$, $(-(\tfrac{1}{2})^{1/2}s, 0)$, (0, 0), $((\tfrac{1}{3})^{1/2}(s/2), -(\tfrac{1}{3})^{1/2}(s/2))$ and $(-(\tfrac{1}{6})^{1/2}s, -(\tfrac{1}{6})^{1/2}s)$. In this way, it is possible to inspect whether or not the line width of the second resist pattern changes while repeatedly increasing and decreasing in the concentric direction.

Figure 16:
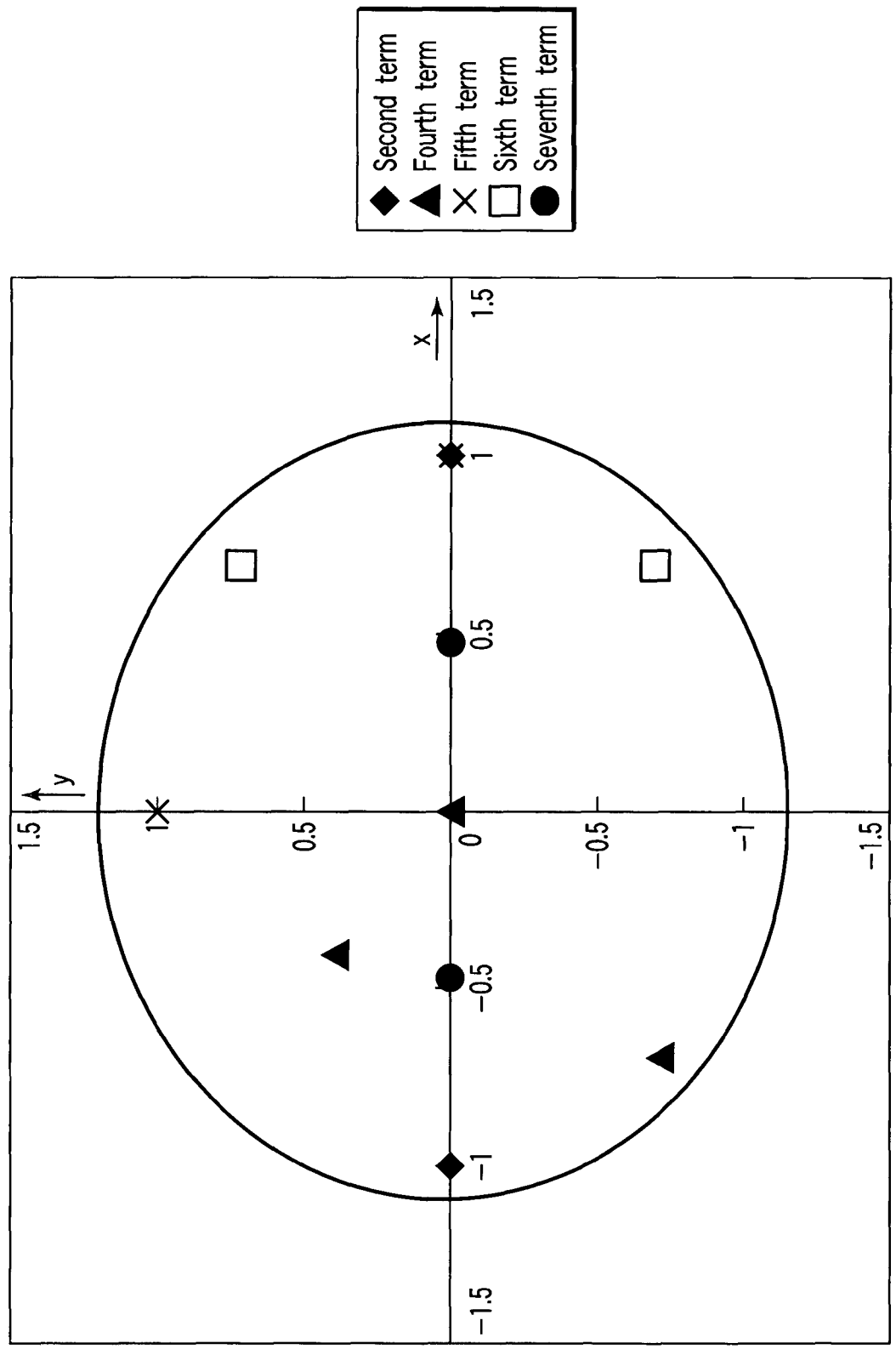
FIG. 16 is a schematic view showing a selection coordinate on a second wafer according to the first embodiment of the present invention.

FIG. 16 shows coordinates set as the selection coordinates by the selection coordinate setting module 124 when the second, fourth, fifth, sixth and seventh terms of the sampling orthogonal polynomial are significant. The line width of the first resist pattern is evenly measured on the first wafer. On the other hand, the line width of the second resist pattern is measured only at the selection coordinates in which the distribution components expressed by second, fourth, fifth, sixth and seventh terms determined as having significance are inspected. In other words, the line width of the second resist pattern is measured at limited portions as compared with the case of measuring the line width of the first resist pattern.

The CPU 300 is connected to a data storage 335. The data storage 335 includes sampling dimension storage module 338 and sampling approximate equation storage module 339. The data storage 335 further includes a sampling error storage module 340, a sampling significant term storage module 341 and a coordinate candidate storage module 342. Specifically, the sampling dimension storage module 338 stores line width of a plurality of portions on the first resist pattern measured by the measuring apparatus 332. The sampling approximate equation storage module 339 stores the sampling orthogonal polynomial approximated by the sampling approximate module 121. The sampling error storage module 340 stores an approximate error e of the sampling orthogonal polynomial calculated by the sampling error calculation module 122. The sampling significant term storage module 341 stores terms of the sampling orthogonal polynomial which include development coefficient determined as having significance by the sampling determination module 123, as significant terms of the sampling orthogonal polynomial. The coordinate candidate storage module 342 stores a table shown in FIG. 15. The table shows the relationship between the significant terms and the selection coordinates in which the distribution components expressed by significant terms are inspected.

The CPU 300 shown in FIG. 1 is further connected to an input device 312, an output device 313, a program storage 330 and a temporary storage 331. As the input device 312, keyboard and mouse may be used. As the output device 313, a liquid crystal display (LCD) and a light-emitting diode (LED) monitor screen may be used. The program storage 330 stores programs executed by the CPU 300 to carry out data exchange between devices connected to the CPU 300. The temporary storage 331 temporarily stores data in the operation progress of the CPU 300.

The measurement coordinate setting method according to the first embodiment will be hereinafter described with reference to a flowchart shown in FIG. 17. The operation result by the CPU 300 shown in FIG. 1 is successively stored in the temporary storage 331.

(a) In step S101, the coater 2 shown in FIG. 2 coats a photoresist on a first wafer using spin coating to form a first resist film on the first wafer. Thereafter, the heater 4 pre-bakes the first resist film. In step S102, the first wafer is placed on the wafer stage 32 of the exposure equipment 3 shown in FIG. 2. The illumination beam source 41 emits an irradiation beam so that a mask pattern image of the photomask on the reticle stage 15 is transferred onto the first resist film. Step and scan is repeated to transfer a plurality of mask pattern images on the first resist film.

(b) In step S103, the heater 4 shown in FIG. 1 carries out post-exposure bake (PEB) treatment with respect to the first resist film. Then, the developer 5 develops the first resist film to form a first resist pattern corresponding to a plurality of mask pattern images on the wafer as a first product. In step S104, the measuring apparatus 332 measures the line width of the first resist pattern on a plurality of measurement coordinates. The line widths measured at the measurement coordinates are stored in the sampling dimension storage module 338 shown in FIG. 1 together with these measurements coordinates.

(c) In step S105, the sampling approximate module 121 reads the line widths of the plurality of portions of the first resist pattern and measurement coordinates thereof from the module 338. In step S106, the module 121 approximates the relationship between the line widths of the first resist pattern and measurement coordinates using the sampling orthogonal polynomial given by the equation (1). The sampling approximate module 121 stores the approximated sampling orthogonal polynomial in the sampling approximate expression storage module 339.

(d) In step S107, the sampling error calculation module 122 reads the sampling orthogonal polynomial from the module 339. The module 122 calculates an approximate error e of the sampling orthogonal polynomial using the equation (11). The module 122 stores the calculated approximate error e of the sampling orthogonal polynomial in the sampling error storage module 340.

(e) In step S108, the sampling determination module 123 reads the approximate error e of the sampling orthogonal polynomial from the module 340. The module 123 determines whether or not the first to ninth development coefficients a1 to a9 of the sampling orthogonal polynomial have significance by F test using the approximate error e of the sampling orthogonal polynomial. The module 123 stores terms of the sampling orthogonal polynomial which have development coefficients determined as being significant in the sampling significant term storage module 341, as significant terms of the sampling orthogonal polynomial.

(f) In step S109, the selection coordinate setting module 124 shown in FIG. 1 reads the significant terms of the sampling orthogonal polynomial from the sampling significant storage module 341. Moreover, the selection coordinate setting module 124 reads from the coordinate candidate storage module 342 the table showing the relationship between the significant terms shown in FIG. 15 and the selection coordinates in which the distribution components expressed by the significant terms is inspected. The module 124 extracts selection coordinates corresponding to the significant terms read from the module 341, from the table read from the module 342. For example, if the second term is significant, the module 124 extracts selection coordinates (s, 0) and (−s, 0) from the table. In step S110, the module 124 sets the extracted coordinates as selection coordinates so that the measuring apparatus 332 measures the line width of the second resist pattern at the extracted coordinates. In this way, measurement coordinate setting according to the first embodiment ends.

According to the measurement coordinate setting method according to the first embodiment, in order to determine the features of the plane distribution of the line width of the first resist pattern manufactured by the manufacturing apparatus 20 shown in FIG. 1, the measuring apparatus 332 evenly measures the line widths of a plurality of portions of the first resist pattern on the first wafer. Then, inspection is made whether or not a second resist pattern manufactured by the same manufacturing apparatus 20 has the plane distribution features of the line width of the first resist pattern. In this case, the measuring apparatus 332 measures the second resist pattern only at the selection coordinates. In other words, there is no need of evenly measuring the line width of the second resist pattern on a plurality of positions. The line width of the second resist pattern is measured only at the selection coordinates. In this way, it is possible to inspect whether or not the second resist pattern has the plane distribution features of the line width of the first resist pattern. Therefore, the measurement coordinate setting system shown in FIG. 1 and the measurement coordinate setting method shown in FIG. 17 has the following advantage. Specifically, it is possible to shorten measuring time required for inspecting the distribution of the line width of the second resist pattern. For resist patterns manufactured after the second resist pattern, measuring the line width only at the selection coordinates suffices to inspect whether or not the resist patterns has the plane distribution features of the line width of the first resist pattern. Moreover, before the second resist pattern is manufactured, the device parameters of the manufacturing apparatus 20 may be changed, so that inspection may be made whether or not the plane distribution features of the line width of the first resist pattern changes in the second resist pattern.

Second Embodiment

Figure 18:
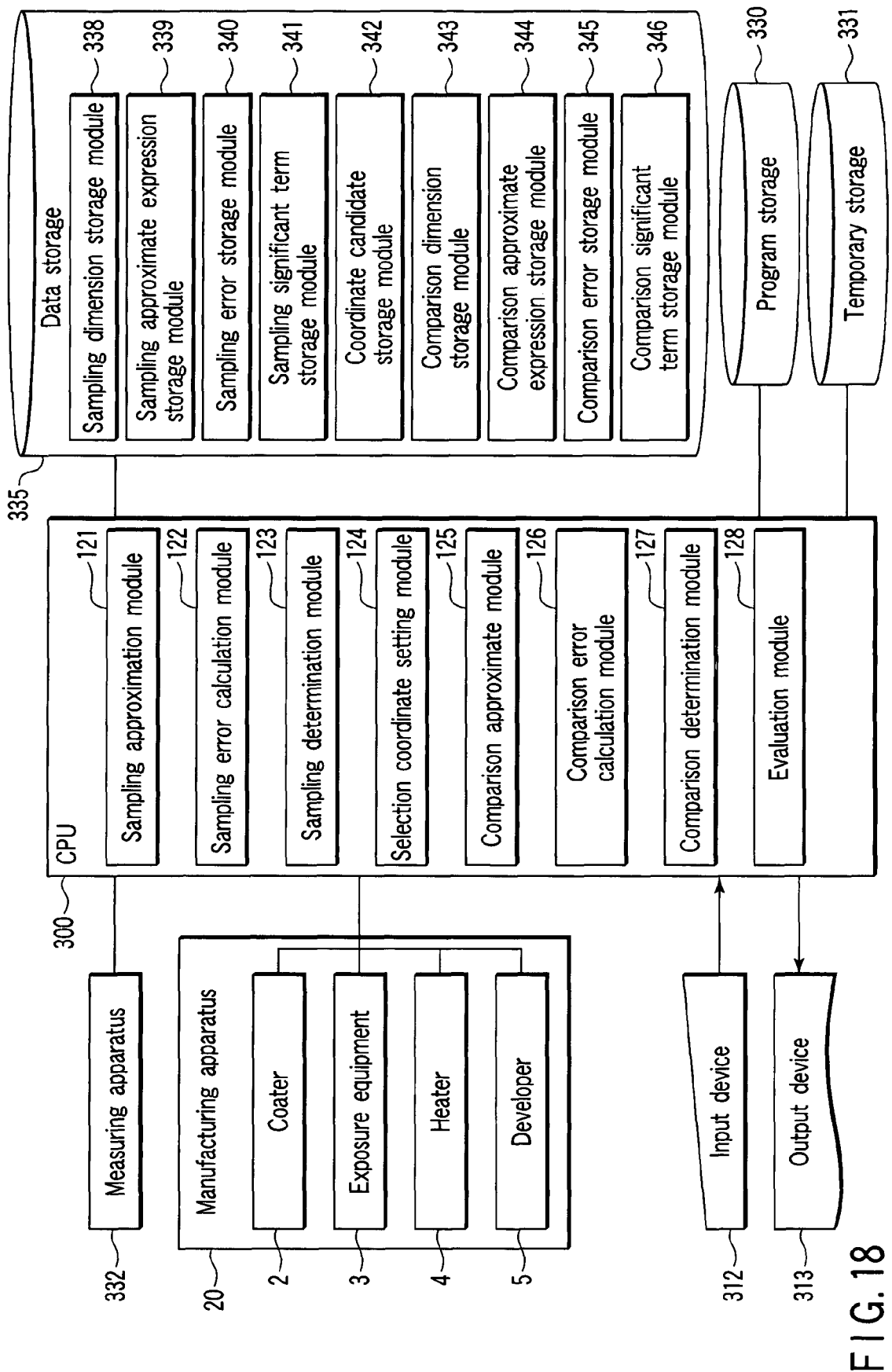
FIG. 18 is a block diagram showing the configuration of a dimensional distribution inspection system according to a second embodiment of the present invention.

As shown in FIG. 18, a dimensional distribution inspection system according to the second embodiment, that is, CPU 300 has the following modules. Specifically, the CPU 300 of the second embodiment includes a sampling approximate module 121, a sampling error calculation module 122, a sampling determination module 123 and a selection coordinate setting module 124 included in the CPU shown in FIG. 1. In addition, the CPU 300 of the second embodiment includes a comparison approximate module 125, a comparison error calculation module 126, a comparison determination module 127 and an evaluation module 128. The comparison approximate module 125 approximates the plane distribution of the line width of the second resist pattern measured at the selection coordinates using a comparison orthogonal polynomial such as Zernike polynomial. If the Zernike polynomial is used, the comparison orthogonal polynomial is given by the foregoing equation (1) like the sampling orthogonal polynomial.

The comparison error calculation module 126 calculates an approximate error e of the comparison orthogonal polynomial using the foregoing equation (11). The comparison determination module 127 determines whether or not the first to ninth development coefficients a1 to a9 included in the comparison orthogonal polynomial each have significance by F test using the approximate error e. The evaluation module 128 compares significant development coefficients of the sampling orthogonal polynomial with those of the comparison orthogonal polynomial. If the significant development coefficients of the comparison orthogonal polynomial differs from those of the sampling orthogonal polynomial, the evaluation module 128 makes evaluation that the plane distribution mode of the second resist pattern changes from that of the first resist pattern. For example, when the development coefficient a2 of the second term of the comparison orthogonal polynomial is larger than that of the sampling orthogonal polynomial, the evaluation module 128 makes evaluation that the x-direction distribution component in the second resist pattern is larger than that in the first resist pattern. Other components of the CPU 300 is the same as the CPU 300 of the measurement coordinate setting system shown in FIG. 1. Therefore, the explanation is omitted.

The data storage 335 of the dimensional distribution inspection system shown in FIG. 18 further includes the following modules. The data storage 335 includes a comparison dimension storage module 343, a comparison approximate expression storage module 344, a comparison error storage module 345 and a comparison significant term storage module 346. The comparison dimension storage module 343 stores the line width of the second resist pattern in the selection coordinates measured by the measuring apparatus 332. The comparison approximate expression storage module 344 stores a comparison orthogonal polynomial approximated by the comparison approximate module 125. The comparison error storage module 345 stores an approximate error e of the comparison orthogonal polynomial calculated by the comparison error calculation module 126. The comparison significant term storage module 346 stores terms of the comparison orthogonal polynomial which include development coefficients determined as having significance by the comparison determination module 127, as a significant term thereof. Other configuration of the data storage 335 is the same as the data storage 335 of the measurement coordinate setting system shown in FIG. 1. Therefore, the explanation is omitted.

The dimensional distribution inspection method according to the second embodiment will be described below with reference to a flowchart shown in FIG. 19. The operation result by the CPU 300 shown in FIG. 18 is sequentially stored in the temporary storage 331.

Figure 17:
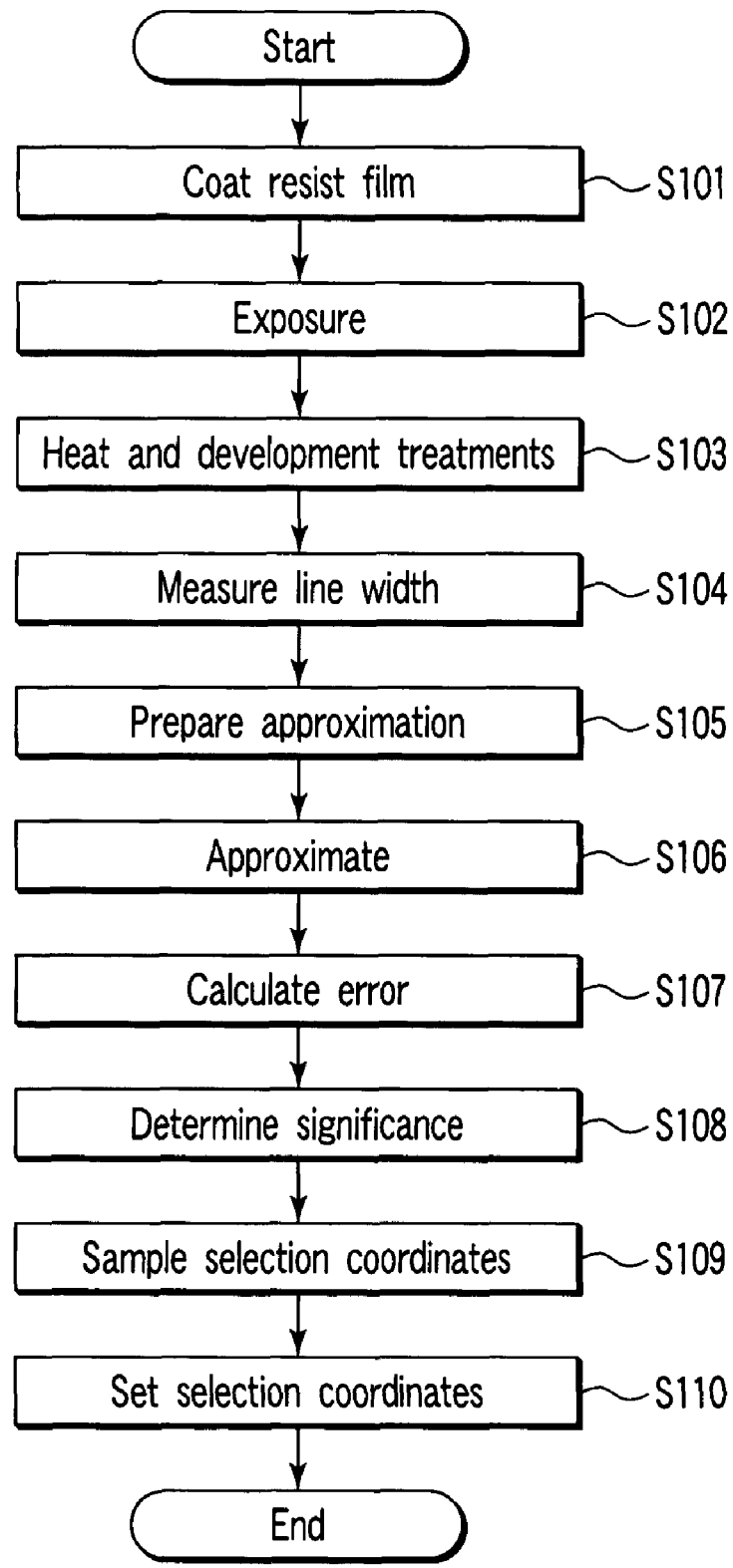
FIG. 17 is a flowchart to explain a measurement coordinate setting method according to the first embodiment of the present invention.
Figure 19:
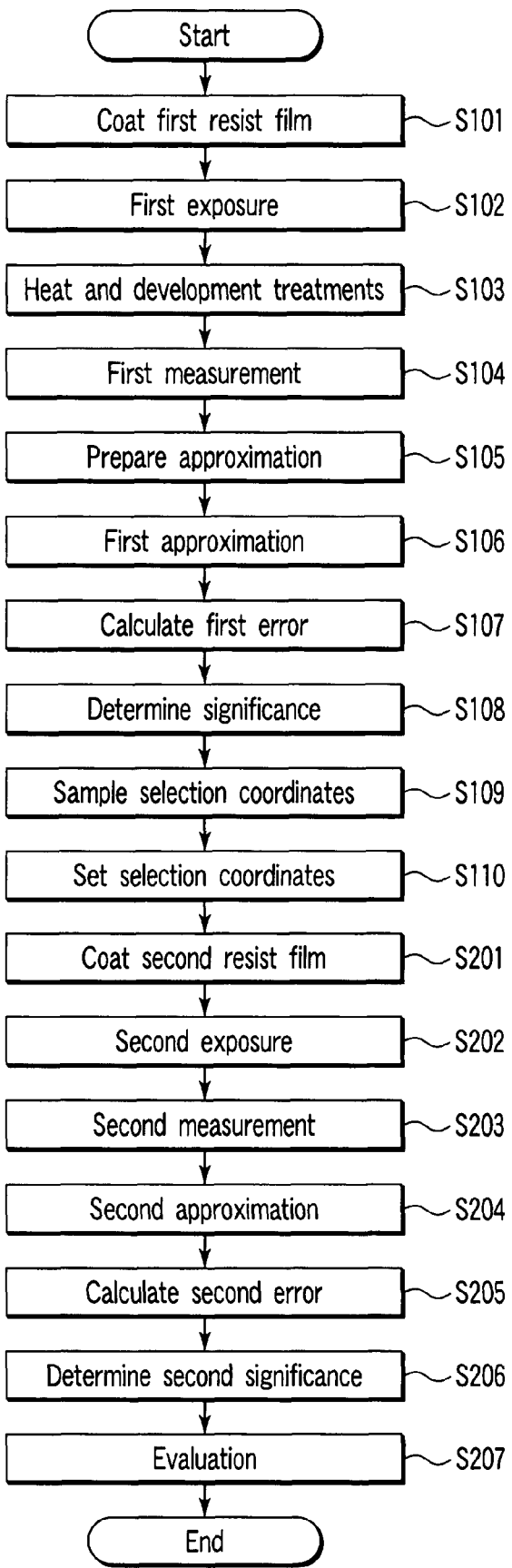
FIG. 19 is a flowchart to explain a dimensional distribution inspection method according to the second embodiment of the present invention.

(a) Like the measurement coordinate setting method described in FIG. 17, steps S101 to S110 of FIG. 19 are first carried out. Via the foregoing steps, the selection coordinate setting module 124 sets selection coordinates in which the line widths of a plurality of portions of the second resist pattern are measured, to the measuring apparatus 332. Following step S110, according to the second embodiment, in step S201, the coater 2 coats a photoresist on a second wafer using spin coating to form a second resist film thereon. Thereafter, the heater 4 pre-bakes the second resist film.

(b) In step S202, the second wafer is placed on the wafer stage 32 of the exposure equipment 3. Step and scan is repeated so that a plurality of mask pattern images are transferred onto the second resist film. After exposure, the heater 4 carries out post-exposure bake (PEB) with respect to the second resist film. The developer 5 develops the second resist film to form a second resist pattern corresponding to a plurality of mask pattern images on the second wafer as a second product.

(c) In step 203, the measuring apparatus 322 measures the line width of the second resist pattern in each of a plurality of selection coordinates. These measured line widths are stored in the comparison dimension storage module 343 together with each selection coordinate. In step S204, the comparison approximate module 125 reads line widths of the plurality of portions of the second resist pattern and the corresponding selection coordinates from the comparison dimension storage module 343. Thereafter, the module 125 approximates the relationship between line widths of the second resist pattern and selection coordinates using the comparison orthogonal polynomial. The module 125 stores the calculated comparison orthogonal polynomial in the comparison approximate expression storage module 344.

(d) In step S205, the comparison error calculation module 126 read the comparison orthogonal polynomial from the comparison approximate expression storage module 344. The module 126 calculates an approximate error e of the comparison orthogonal polynomial using the foregoing equation (11). The module 126 stores the calculated approximate error e of the comparison orthogonal polynomial in the comparison error storage module 345.

(e) In step S206, the comparison determination module 127 reads the approximate error e of the comparison orthogonal polynomial from the comparison error storage module 345. The module 127 determines whether or not first to ninth development coefficients a1 to a9 of the comparison orthogonal polynomial have significance by equal dispersion test (F test) using the approximate error e of the comparison orthogonal polynomial. The module 127 stores terms of the comparison orthogonal polynomial which have development coefficients with significance, as significant terms of the comparison orthogonal polynomial, in the comparison significant term storage module 346.

(f) In step S207, the evaluation module 128 reads the significant terms of the comparison orthogonal polynomial from the comparison significant term storage module 341. Moreover, the module 128 reads the comparison orthogonal polynomial from the comparison significant term storage module 346. Then, the module 128 compares development coefficients of the significant terms of sampling orthogonal polynomial with that of the comparison orthogonal polynomial. If the development coefficient values differs from each other, the module 128 makes evaluation that the plane distribution mode of the line width in the second product changes from the plane distribution mode of the line width in the first product. Via the foregoing steps, the dimensional distribution inspection according to the second embodiment ends.

According to the dimensional distribution inspection method of the second embodiment, it is possible to monitor a change of the plan distribution of the line width of resist patterns manufactured by the manufacturing apparatus 20. According to the prior art, many line widths of a plurality of resist patterns must be evenly measured to monitor a change of the plan distribution of the line width of resist patterns. In contrast, according to the dimensional distribution inspection method of the second embodiment, the line width of the second resist pattern is measured only at the selection coordinates. Therefore, it is possible to monitor a change of the plane distribution of the line width for a short time.

The present invention is not limited to the foregoing embodiments. For example, according to the dimensional distribution inspection method of the second embodiment, in step S205 of FIG. 19, if the second resist pattern has the line width plane distribution largely different from the first resist pattern, the approximate error e of the comparison orthogonal polynomial becomes large. In such a case, determination may be made that it is impossible to inspect the line width plane distribution of the second resist pattern by measuring the line width only at the selection coordinates. To make it possible to inspect the line width plane distribution of the second resist pattern, it is considered that the line width of the second resist pattern is re-measured at a plurality of measurement positions. Also, in step S207, if the development coefficient of the significant terms of the comparison orthogonal polynomial differs from that of the sampling orthogonal polynomial, determination may be made by the evaluation module 128 shown in FIG. 18 that it is impossible to inspect the line width plane distribution of the second resist pattern by measuring the line width only at the selection coordinates. To make it possible to inspect the line width plane distribution of the second resist pattern, it is considered that the line width of the second resist pattern is re-measured at a plurality of measurement positions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A measurement coordinate setting system comprising:
a measuring apparatus which measures a dimension in each of a plurality of portions of a first product;
a sampling approximation module which approximates a distribution of the dimensions of the plurality of portions using a sampling orthogonal polynomial as a function of a coordinate; and
a selection coordinate setting module which sets a plurality of selection coordinates at which dimensions of a second product are to be measured to inspect the approximated distribution of the dimensions regarding the second product.

2. The measurement coordinate setting system according to claim 1, further comprising:
a sampling determination module which determines significance of a development coefficient of each of terms of the sampling orthogonal polynomial.

3. The measurement coordinate setting system according to claim 2, wherein the plurality of selection coordinates include coordinates in which distribution components expressed by the terms of the sampling orthogonal polynomial each of which terms includes the development coefficient determined as having significance are inspected with respect to the second product.

4. The measurement coordinate setting system according to claim 1, wherein the sampling orthogonal polynomial is a Zernike polynomial.

5. The measurement coordinate setting system according to claim 2, wherein the sampling determination module determines the significance of the development coefficient by equal dispersion test.

6. A measurement coordinate setting system comprising:
a measuring apparatus which measures a dimension of each of a plurality of portions of a first product;
a sampling approximation module which approximates a distribution of the dimensions of the plurality of portions using a sampling orthogonal polynomial as a function of a coordinate, and calculates a development coefficient in each of the terms of the sampling orthogonal polynomial;
a sampling error calculation module which calculates an approximate error e of the sampling orthogonal polynomial;
a sampling determination module which determines whether or not the development coefficients of the terms of the sampling orthogonal polynomial have significance, using the approximate error e of the sampling orthogonal polynomial; and
a selection coordinate setting module which sets as selection coordinates a plurality of coordinates corresponding to the terms of the sampling orthogonal polynomial which terms include the development coefficients determined as having significance by the sampling determination module to inspect the approximated distribution of the dimensions regarding a second product.

7. The measurement coordinate setting system according to claim 6, wherein the sampling determination module determines the significance of the development coefficient by equal dispersion test.

8. The measurement coordinate setting system according to claim 6, wherein the sampling orthogonal polynomial is a Zernike polynomial.

9. The measurement coordinate setting system according to claim 6, further comprising a manufacturing apparatus which manufactures the first product on a wafer.

10. The measurement coordinate setting system according to claim 6, wherein the sampling error calculation module calculates the approximate error e of the sampling orthogonal polynomial using a following equation $$e = \sqrt{\frac{\sum_{i=1}^{m}(W_{fit}(r_i, \phi_i) - W_{act}(r_i, \phi_i))^2}{m}} \quad (11)$$

where "r" indicates a distance between the origin 0 of an x-y coordinate system defined on a plane and a measurement coordinate in which a portion of the first product is measured, "$\phi$" indicates an angle between a straight line connecting the origin 0 and the measurement coordinate and the X axis, "Wfit (r, $\phi$)" indicates an approximate value of the portion of the first product in a measurement coordinate (r, $\phi$) on the plane, "Wact (r, $\phi$)" indicates an actual measured value of the portion of the first product in the measurement coordinate (r, $\phi$) on the plane, "i" is a natural number, "($r_i$, $\phi_i$)" indicates an i coordinate in which the actual measured value of the portion of the first product is measured, and "m" is a natural number and expresses the total number of measurement coordinates in which the actual measured value of the portion of the first product is measured.

11. The measurement coordinate setting system according to claim 6, further comprising a data storage, wherein the data storage includes:
a sampling dimension storage module which stores dimensions of the plurality of portions on the first product measured by the measuring apparatus,
a sampling approximate equation storage module which stores the sampling orthogonal polynomial approximated by the sampling approximate module,
a sampling error storage module which stores the approximate error e of the sampling orthogonal polynomial calculated by the sampling error calculation module,
a sampling significant term storage module which stores terms of the sampling orthogonal polynomial which include the development coefficients determined as having significance by the sampling determination module, as significant terms of the sampling orthogonal polynomial, and
a coordinate candidate storage module which stores a table showing a relationship between the significant terms and the selection coordinates in which the distribution components expressed by significant terms are inspected.

12. A measurement coordinate setting system according to claim 6, wherein the dimensions of the plurality of portions of the second product at the selection coordinates are measured by the measuring apparatus, further comprising:
a comparison approximate module which approximates a distribution of the portions of the second product measured at the selection coordinates using a comparison orthogonal polynomial,
a comparison error calculation module which calculates an approximate error e of the comparison orthogonal polynomial,
a comparison determination module which determines whether or not terms of the comparison orthogonal polynomial have significance, using the approximate error e of the comparison orthogonal polynomial.
an evaluation module which compares development coefficients of the terms of the sampling orthogonal polynomial determined as having significance with those of the comparison orthogonal polynomial to inspect whether or not the distribution of the second product changes from that of the first product.

13. The measurement coordinate setting system according to claim 12, wherein the sampling determination module determines the significance of the development coefficient by equal dispersion test.

14. The measurement coordinate setting system according to claim 12, wherein the sampling orthogonal polynomial is a Zernike polynomial.

15. The measurement coordinate setting system according to claim 12, further comprising a data storage, wherein the data storage includes:
a comparison dimension storage module which stores the dimensions of the plurality of portions on the second product measured by the measuring apparatus and the selection coordinates at which the dimensions of the plurality of portions on the second product are measured,
a comparison approximate equation storage module which stores the comparison orthogonal polynomial approximated by the comparison approximate module,
a comparison error storage module which stores the approximate error e of the comparison orthogonal polynomial calculated by the comparison error calculation module, and
a comparison significant term storage module which stores terms of the comparison orthogonal polynomial which include the development coefficients determined as having significance by the comparison determination module, as significant terms of the comparison orthogonal polynomial.

16. A measurement coordinate setting method comprising:
measuring a dimension in each of a plurality of portions of a first product;
approximating a distribution of the dimensions of the plurality of portions using a sampling orthogonal polynomial as a function of a coordinate; and
setting a plurality of selection coordinates at which dimensions of a second product are to be measured to inspect the approximated distribution of the dimensions regarding the second product.

17. The measurement coordinate setting method according to claim 16, further comprising determining significance of a development coefficient of each of terms of the sampling orthogonal polynomial.

18. The measurement coordinate setting method according to claim 17, wherein the significance of the development coefficient is determined by equal dispersion test.

19. The measurement coordinate setting method according to claim 17, wherein the plurality of selection coordinates include coordinates in which distribution components expressed by the terms of the sampling orthogonal polynomial each of which terms includes the development coefficient determined as having significance are inspected with respect to the second product.

20. The measurement coordinate setting method according to claim 16, wherein a Zernike polynomial is used as the sampling orthogonal polynomial.

* * * * *

UNITED STATES PATENT AND TRADEMARK OFFICE
CERTIFICATE OF CORRECTION

PATENT NO. : 7,756,656 B2
APPLICATION NO. : 11/783472
DATED : July 13, 2010
INVENTOR(S) : Asano It is certified that error appears in the above-identified patent and that said Letters Patent is hereby corrected as shown below:

Claim 12, column 18, line 4, change "polynomial." to --polynomial, and--.

Signed and Sealed this

Seventh Day of September, 2010

David J. Kappos
*Director of the United States Patent and Trademark Office*